United States Patent [19]

Okamura et al.

[11] Patent Number: 5,545,683
[45] Date of Patent: Aug. 13, 1996

[54] COATING SURFACE-LUSTERING AGENT

[75] Inventors: Kiyoshi Okamura, Fujisawa; Seigo Shinohara, Kanagawa-ken, both of Japan

[73] Assignee: Taiho Industries Co., Ltd., Tokyo, Japan

[21] Appl. No.: 365,492

[22] Filed: Dec. 28, 1994

[30] Foreign Application Priority Data

Dec. 28, 1993 [JP] Japan ................. 5-335668

[51] Int. Cl.$^6$ ................................. C08L 91/06
[52] U.S. Cl. .................. 524/277; 524/487; 524/506; 524/588; 106/10; 106/11
[58] Field of Search ................ 106/10, 11; 524/588, 524/506, 277, 487

[56] References Cited

U.S. PATENT DOCUMENTS

| | | | |
|---|---|---|---|
| 3,856,533 | 12/1974 | Schnurrbusch et al. | 106/10 |
| 3,890,271 | 6/1975 | Kokoszka | 106/10 |
| 4,587,287 | 5/1986 | Matsuda et al. | 524/588 |
| 4,859,359 | 8/1989 | DeMatteo et al. | 106/11 |
| 4,990,485 | 2/1991 | Egashira et al. | 428/474.4 |
| 4,990,561 | 2/1991 | Yoshioka | 524/850 |
| 5,045,584 | 9/1991 | Sasaki et al. | 106/10 |
| 5,154,759 | 10/1992 | Cifuentes et al. | 106/11 |
| 5,288,314 | 2/1994 | Howard et al. | 106/11 |

FOREIGN PATENT DOCUMENTS

| | | | |
|---|---|---|---|
| 4-202389 | 7/1992 | Japan | 524/588 |
| 5-032934 | 2/1993 | Japan | 524/588 |

*Primary Examiner*—Mark D. Sweet
*Attorney, Agent, or Firm*—Browdy and Neimark

[57] ABSTRACT

A coating surface-lustering agent providing both excellent water repellence and stainproofing to coating surfaces is provided and suitable for use in lusterig the coating surfaces of bodies of automobiles, electric cars, aircraft or office furniture, or outside walls of buildings. The coating surface-lustering agent contains at least one modified silicone resin selected from the group consisting of an acrylurethane-modified silicone resin, acryl-modified silicone resin and fluoroacryl-modified silicone resin.

16 Claims, No Drawings

COATING SURFACE-LUSTERING AGENT

BACKGROUND OF THE INVENTION

1. Field of the Invention

The present invention relates to a coating surface-lustering agent, more particularly to a coating surface-lustering agent suitable for use in lustering the coating surfaces of bodies of automobiles, electric cars, aircraft or office furniture, or outside walls of buildings, particularly suitable for use in lustering the bodies of automobiles, which is excellent in providing both water repellence and stainproofing to coating surfaces for a long period.

2. Description of Related Art

Hitherto a lustering agent mainly composed of a dimethyl silicone oil has often been used. However, such a lustering agent is easily electrostatically charged, so that dust is adsorbed on the agent-coated surface. Therefore, the agent-coated surface cannot be kept glossy for a long period. Thus, the lustering agent is poor in stainproofing.

It is in general known that coating surface-lustering agents providing an excellent water repellence are so poor in stainproofing that stains cannot be removed by water washing alone and, to the contrary, agents having a better stainproofing are poor in water repellence.

A coating surface-lustering agent which is excellent both in providing water repellence and stainproofing has been demanded.

SUMMARY OF THE INVENTION

The object of the present invention is to provide a coating surface-lustering agent which is excellent both in water repellence and stainproofing.

The first aspect of the present invention is a coating surface-lustering agent characterized by containing a silicone resin having hydroxyl group or an alkoxyl group.

The second aspect of the present invention is a coating surface-lustering agent characterized by containing at least one modified silicone resin selected from the group consisting of an acrylurethane-modified silicone resin, acryl-modified silicone resin and fluoroacryl-modified silicone resin.

The third aspect of the present invention is a coating surface-lustering agent characterized by containing the silicone resin of the first aspect above, the at least one modified silicone resin of the second aspect above, a petroleum hydrocarbon and/or an alcohol having a carbon number of 1 to 20, and a wax.

The fourth aspect of the present invention is the coating surface-lustering agent of the third aspect above, wherein the content of the silicone resin of the first aspect above and the at least one modified silicone resin of the second aspect above is in the range of 1 to 20 wt %.

The fifth aspect of the present invention is the coating surface-lustering agent of the third aspect and the fourth aspect above, wherein the content of the wax is in the range of 1 to 20 wt %.

The sixth aspect of the present invention is the coating surface-lustering agent of any one of the first aspect to the fifth aspect above, wherein 1 to 20 wt % of an abrasive is contained.

The present invention will be in detail described below.

The coating surface-lustering agent of the present invention contains a silicone resin having hydroxyl group or an alkoxyl group.

The silicone resin having hydroxyl group or an alkoxyl group may be all silicone resins having the hydroxyl group or alkoxyl group in the molecule thereof. For example, a silicone resin having hydroxyl group or an alkoxyl group such as methoxyl group or ethoxyl group in the molecule thereof may suitably be used.

The coating surface-lustering agent of the present invention contains at least one silicone resin selected from the group consisting of an acrylurethane-modified silicone resin, acryl-modified silicone resin and fluoroacryl-modified resin.

The acrylurethane-modified silicone resin used is not limited and may be a silicone resin modified with an acryl resin and urethane resin. The acryl-modified silicone resin used is not limited and may be a silicone resin modified with an acryl resin. The fluoroacryl-modified silicone resin is not limited and may be a silicone resin modified with a fluorine resin and acryl resin.

The coating surface-lustering agent of the present invention contains the above-specified silicone resin and/or modified silicone resin, so that it provides the coating surface thereon with a highly hard, highly adhesive film. This film can effectively prevent the invasion of dust and stain in the coating surface.

A wax may be contained in the coating surface-lustering agent of the present invention. Use of the wax can provide the coating surface with a high stainproofing and also improve the water repellence.

The wax reference may include a vegetable wax such as carnauba wax, Japan tallow, auricular wax and espal wax; an animal wax such as bee's wax, insect wax, shellac wax and whale wax; a petroleum wax such as paraffin wax, microcrystal wax, polyethylene wax, ester wax and oxide wax; and a mineral wax such as montan wax, ozokerite and ceresine; and further a modified wax, glyceride, synthetic ketone-amine amide and hydrogen wax.

In addition to these waxes reference may be made to a higher fatty acid such as palmitic acid, stearic acid, margaric acid and behenic acid; a higher alcohol such as palmityl alcohol, stearyl alcohol, behenyl alcohol, marganyl alcohol, myricyl alcohol and eicosanol; a higher aliphatic ester such as palmitic cetyl, palmitic myricyl, stearic cetyl and stearic myricyl; an amide such as acetamide, propionic amide, palmitic amide, stearic amide and amide wax; and a higher amine such as stearyl amine, behenyl amine and palmityl amine.

One or more of these acids, alcohols, esters, amides and amines may be used singly or in combination.

Of these substances are preferred the paraffin wax, carnauba wax, polyethylene wax and various amide waxes, particularly the polyethylene wax having a low molecular weight and high density is preferred to prepare a lustering agent having a good operability.

It is preferred that lustering agent of the present invention comprises the above-mentioned silicone resin and/or the above-mentioned modified silicone resin and the above-mentioned wax dispersed or dissolved in a solvent of petroleum hydrocarbon and/or an alcohol having a carbon number 1 to 20.

The operability of the lustering agent of the present invention is improved by using the above-mentioned petroleum hydrocarbon and/or alcohol.

The petroleum solvent is not particularly limited and may be such as petroleum naphtha, solvent naphtha, petroleum ether, petroleum benzine, isoparaffin, normal paraffin, dekalin, industrial gasoline, ligroin, kerosene, etc.

These solvents may be used singly or in combination. Of these solvents are most preferably used kerosene, petroleum naphtha and solvent naphtha.

As the alcohol having a carbon number of 1 to 20 reference may be made to a monohydric alcohol such as methyl alcohol, ethyl alcohol, n-propyl alcohol, iso-propyl alcohol, n-butyl alcohol, iso-butyl alcohol, sec-butyl alcohol, tert-butyl alcohol, allyl alcohol, crotyl alcohol; a dihydric alcohol such as ethylene glycol, propylene glycohol and diethylene glycol; and a glycol ether such as ethylene glycol monomethyl ether, ethylene glycol monoethyl ether, ethylene glycol monobutyl ether and ethylene glycol dimethyl ether. One or more of these alcohols may be used singly or in combination.

The coating surface-lustering agent of the present invention may contain an abrasive. Use of the abrasive improves the washability.

As the abrasive can be used known powdery abrasives such as organic or inorganic powders, and reference may be made to, for example, alumina, silica, carborundum, calcium carbonate, silica sand, zirconium oxide and diatomaceous earth.

The alumina is not limited and may be not only α-alumina, γ-alumina but also of other types. The carborundum is a high hardness mineral powder and in general called silicon carbide. The silica sand is represented by $SiO_2$ and not particularly limited. For example, it may be quartz particles which occurred due to weathering of acidic rocks. The zirconium oxide and diatomaceous earth above are not particularly limited. Zirconium oxide and diatomaceous earth known per se may be used.

As the organic powder reference may be made to a polyethylene resin fine powder, nylon resin fine powder, fluororesin fine powder, silicone resin fine powder, acryl resin powder, styrene resin fine powder and cellulose resin fine powder.

The abrasive used in the present invention is normally of 10 μm or less, or preferably 1 to 5 μm in particle size. Such a particle size does not damage the surface of an article to be coated.

The coating surface-lustering agent may contain a silicone oil therein.

The silicone oil is not particularly limited. Silicone oils known per se can be used such as dimethyl silicone, phenyl silicone, amino-modified silicone oil, alkyl-modified silicone oil, vinyl-modified silicone oil, methylphenyl silicone and polyether-modified silicone oil. These silicone oils may be used singly or in combination. Of these silicone oils are preferred dimethyl silicone, phenyl silicone and amino-modified silicone. The viscosity of the silicone oil is normally in the range of 1 to 15,000 c/s, preferably 2 to 10,000 c/s.

Preferably, the coating surface-lustering agent may contain 1 to 20 wt %, preferably 1 to 10 wt % of the silicone resin and/or modified silicone resin above. This specific amount of the silicone resin and/or modified silicone resin can achieve the desired stainproofing and lustering effect.

When the coating surface-lustering agent of the present invention contains the wax, the content of the wax is normally 0.1 to 0.5 time, preferably 0.3 to 3.0 time, particularly preferably 0.5 to 2.0 time the content of the silicone resin and modified silicone resin. If the content is larger than 5.0 time, the washability may be reduced. If the content is less than 0.1 time, on the other hand, then the desired effect by the wax addition cannot be achieved.

The content of the petroleum solvent and/or the alcohol contained in the coating surface-lustering agent, that is, the amount of the agent from which the above-mentioned contents are removed, is normally in the range of 60 to 95 wt %, preferably 70 to 85 wt %. If it exceeds 95 wt %, the contents of the silicone and wax are relatively reduced, so that the lustering effect becomes poor. If it is less than 60 wt %, then the content of the silicone and wax increases relatively and, as a result, the viscosity of the agent is so raised that operations such as application or wiping of the agent become poor.

The content of the silicone oil contained in the coating surface-lustering agent of the present invention is normally in the range of 0.1 to 5.0 time, preferably 0.3 to 4.0 time the content of the silicone resin and/or modified silicone resin. If it exceeds 5.0 time, the washability may be reduced.

The content of the abrasive is normally in the range of 0.1 to 20.0 wt %, preferably 1.0 to 10.0 wt %.

The coating surface-lustering agent of the present invention may contain proper amounts of a rust preventive, lower polyhydric alcohol, fluorescent pigment and dust preventive, if desired.

The present invention will be illustrated below with reference to some examples and comparative examples.

EXAMPLES 1 TO 17 AND COMPARATIVE EXAMPLE 1

Samples were prepared with the components and proportions as shown in Table 1 and evaluated below. The results are shown in Table 2. The "part" in Table 1 is on the weight basis.

The compounds used in the Examples and Comparative Example are as follows:
Hydroxyl group-containing silicone resin:
SH-6018 produced by Toray Dow Corning Co., Ltd.
Alkoxyl group-containing silicone resin:
DC-3037 produced by Toray Dow Corning Co., Ltd.
Acrylurethane-modified silicone resin:
UA-40 produced by Sanyo Chemical Industries, Ltd.
Fluoroacryl-modified silicone resin:
SF-3 produced by Sanyo Chemical Industries, Ltd.
Polyethylene wax:
Mitsui High Wax 400P produced by Mitsui Petrochemical Industries, Ltd.
Dimethyl silicone:
L-45 2 c/s
L-45 1,000 c/s
L-45 10,000 c/s produced by Nippon Unicar Co., Ltd.
Petroleum solvent:
Dianasolvent produced by Idemitsu Petrochemical Co., Ltd.
In column of "Dimethyl silicone" of Table 1, "A" denotes L-45 2 c/s, "B" L-45 1,000 c/s and "C" L-45 10,000 c/s.
Evaluation:
Stainproofing:
Five white color coated automobiles were provided: two thereof made by Toyota Motor Corporation, two by Nissan Motor Co. Ltd. and one by Isuzu Motors Ltd. The formulated sample compositions each was applied to these automobiles and wiped with a cloth after 10 minutes. The whiteness of each of the automobiles was determined.

These automobiles were run for three months and then washed with water. An amount of water remaining on the applied surface was wiped with a cloth. The whiteness was determined on the applied surface. The determination of the whiteness was made with a color analyzer, TC-1800 made by Tokyo Denshoku K. K. A degree of staining was calculated through the following equation from the measurements of the whiteness before and after the running of the automobiles for 3 months:

Degree of staining=100–(measurements after running/measurements before running)×100

The evaluation of stainproofing was made based on the following criteria:

Stainproofing 1: Degree of staining=15.0–20.0 Highly stained; no stainproofing

Stainproofing 2: Degree of staining=10.0–15.0 Clearly stained; low stainproofing Stainproofing 3: Degree of staining=5.0–10.0 Slightly stained; stainproofing Stainproofing 4: Degree of staining=0–5.0 Almost not stained; good stainproofing Water repellence Automobiles run for 3 months in the same manner as mentioned above were adequately wiped to remove moisture thereon. Water was scattered on the applied surface with a trigger-type sprayer. Formation of water drops was visually observed and evaluated according to the following criteria:

1: No water drops were formed; no water repellence

2: Irregularly shaped water drops were formed and broadly spread

3: Irregularly shaped and spherical water drops both were formed

4: Spherical water drops were formed.

COMPARATIVE EXAMPLE 2 TO 4

The following lustering agents were evaluated for the stainproofing and water repellence in the same manner as in Examples 1 to 17. The results are shown in Table 2.

COMPARATIVE EXAMPLE 2

Coating wax: Titan Coat White produced by Wilson Corporation

COMPARATIVE EXAMPLE 3

Semi-milled wax: Soft 99 hanneri produced by Nitto Chemical Industry Co., Ltd.

COMPARATIVE EXAMPLE 4

Solid wax: Sharewocester Imperial Brightmaster produced by Dowa K. K.

As shown in Table 2, the stainproofing of the coating surface-lustering agent of the present invention was 3 to 4 which is equal to or higher than that of the coating wax (Comparative Example 2, Stainproofing 3) which is known to have a stainproofing property. The water repellence of the coating surface-lustering agent of the present invention was equal to or higher than that of the solid wax which is known to have a good water repellence. Therefore, the coating surface-lustering agent of the present invention has been found to be excellent both in the stainproofing and water repellence. Thus, the coating surface-lustering agent of the present invention is highly useful in industries.

TABLE 1

| Example | Silicone resin Kind* | Silicone resin Amount (part) | Amount of isopropyl alcohol (part) | Amount of polyethylene wax (part) | Kind & Amount of dimethyl silicone (part) | Amount of petroleum solvent (part) |
| --- | --- | --- | --- | --- | --- | --- |
| 1 | HYD | 6.0 | 10.0 | — | — | 84.0 |
| 2 | ALK | 6.0 | 10.0 | — | — | 84.0 |
| 3 | ACR | 6.0 | 10.0 | — | — | 84.0 |
| 4 | FLU | 6.0 | 10.0 | — | — | 84.0 |
| 5 | HYD | 6.0 | 10.0 | 10.0 | B, 5.0 | 69.0 |
| 6 | ACR | 6.0 | 10.0 | 10.0 | B, 5.0 | 69.0 |
| 7 | FLU | 6.0 | 10.0 | 10.0 | B, 5.0 | 69.0 |
| 8 | HYD ACR | 3.0 3.0 | 10.0 | 10.0 | B, 5.0 | 69.0 |
| 9 | HYD FLU | 3.0 3.0 | 10.0 | 10.0 | B, 5.0 | 69.0 |
| 10 | ACR FLU | 3.0 3.0 | 10.0 | 10.0 | B, 5.0 | 69.0 |
| 11 | HYD ACR FLU | 2.0 2.0 2.0 | 10.0 | 10.0 | B, 5.0 | 69.0 |
| 12 | HYD | 2.0 | 10.0 | 10.0 | B, 5.0 | 73.0 |
| 13 | HYD | 10.0 | 10.0 | 10.0 | B, 5.0 | 65.0 |
| 14 | HYD | 6.0 | 10.0 | 10.0 | A, 5.0 | 69.0 |
| 15 | HYD | 6.0 | 10.0 | 10.0 | C, 5.0 | 69.0 |
| 16 | HYD | 6.0 | 10.0 | 10.0 | B, 10.0 | 64.0 |
| 17 | HYD | 6.0 | 10.0 | 10.0 | A, 20.0 | 54.0 |
| Comp.1 | — | — | 10.0 | 10.0 | B, 10.0 | 70.0 |

*HYD: hydroxyl group-containing resin
ALK: alkoxyl group-containing resin
ACR: acrylurethane-modified resin
FLU: fluoroacryl-modified resin

TABLE 2

| Example | Whiteness Initial | Whiteness After 3 months | Degree of Staining | Stain-proofing | Water Repellence |
|---|---|---|---|---|---|
| 1 | 50.2 | 49.2 | 2.0 | 4 | 2 |
| 2 | 50.2 | 48.6 | 3.2 | 4 | 2 |
| 3 | 50.2 | 48.6 | 3.2 | 4 | 2 |
| 4 | 50.2 | 49.0 | 2.4 | 4 | 3 |
| 5 | 57.8 | 56.4 | 2.4 | 4 | 4 |
| 6 | 57.8 | 56.4 | 2.4 | 4 | 3 |
| 7 | 57.8 | 55.2 | 4.5 | 4 | 4 |
| 8 | 57.8 | 55.4 | 4.2 | 4 | 3 |
| 9 | 60.3 | 56.9 | 5.6 | 3 | 3 |
| 10 | 60.3 | 59.4 | 1.7 | 4 | 4 |
| 11 | 60.3 | 57.3 | 5.0 | 4 | 3 |
| 12 | 60.3 | 56.2 | 6.8 | 3 | 2 |
| 13 | 47.3 | 43.1 | 8.9 | 3 | 2 |
| 14 | 47.3 | 46.7 | 1.3 | 4 | 3 |
| 15 | 47.3 | 44.0 | 7.0 | 3 | 4 |
| 16 | 47.3 | 43.3 | 8.5 | 3 | 4 |
| 17 | 60.7 | 60.0 | 1.2 | 4 | 3 |
| Comp. | | | | | |
| 1 | 60.7 | 56.4 | 7.1 | 3 | 3 |
| 2 | 60.7 | 57.3 | 5.6 | 3 | 1 |
| 3 | 60.7 | 49.6 | 18.3 | 1 | 1 |
| 4 | 50.2 | 44.3 | 11.8 | 2 | 3 |

According to the present invention, the lustering agent provided can provide both excellent water repellence and stainproofing to coating surfaces.

Since the lustering agent of the present invention provides both excellent water repellence and stainproofing to coating surfaces, invasion of dust in the coating surfaces can be prevented and thus an amount of dust adhered to the coating surfaces can easily be removed by water washing.

Moreover, washing and lustering can simultaneously be made by using the lustering agent of the present invention.

What is claimed is:

1. A coating surface-lustering agent containing at least one modified silicone resin selected from the group consisting of an acrylurethane-modified silicone resin and 1 to 20 wt % of an abrasive and fluoroacryl-modified silicone resin.

2. A coating surface-lustering agent containing a silicone resin having a hydroxyl group or an alkoxyl group, a modifed silicone resin selected from the group consisting of an acrylurethane-modified silicone resin and fluoroacryl-modified silicone resin, at least one solvent selected from the group consisting of a petroleum hydrocarbon and an alcohol having a carbon number of 1 to 20, and a wax.

3. A coating surface-lustering agent of claim 2, wherein the content of the silicone resin having a hydroxyl group or an alkoxyl group and the modified silicone resin selected from the group consisting of an acrylurethane-modified silicone resin and fluoroacryl-modified silicone resin is in the range of 1 to 20 wt %.

4. A coating surface-lustering agent recited in claim 2, wherein the content of the wax is in the range of 1 to 20 wt %.

5. A coating surface-lustering agent recited in claim 3, wherein the content of the wax is in the range of 1 to 20 wt %.

6. A coating surface-lustering agent recited in claim 2 further including 1 to 20 wt % of an abrasive.

7. A coating surface-lustering agent recited in claim 3 further including 1 to 20 wt % of an abrasive.

8. A coating surface-lustering agent recited in claim 4 further including 1 to 20 wt % of an abrasive.

9. A coating surface-lustering agent recited in claim 5 further including 1 to 20 wt % of an abrasive.

10. A coating surface-lustering agent consisting essentially of a silicone resin having a hydroxyl group, isopropyl alcohol, a petroleum solvent, and optionally, a wax and/or an abrasive.

11. The coating surface-lustering agent of claim 10, wherein a wax is present.

12. A coating surface-lustering agent consisting essentially of a silicone resin having a hydroxyl group, isopropyl alcohol, a silicone oil, a petroleum hydrocarbon solvent, and optionally, a wax and/or an abrasive.

13. The coating surface-lustering agent of claim 12, wherein a wax is present.

14. The coating surface-lustering agent of claim 10, wherein an abrasive is present.

15. The coating surface-lustering agent of claim 12, wherein a wax and an abrasive are present.

16. A coating surface-lustering agent comprising a silicone resin having an alkoxyl group and isopropyl alcohol.

* * * * *